(12) United States Patent
Ma et al.

(10) Patent No.: US 12,212,874 B2
(45) Date of Patent: Jan. 28, 2025

(54) MONITOR SYSTEM AND METHOD FOR CONTROLLING DISPLAYING THEREOF

(71) Applicant: BOE Technology Group Co., Ltd., Beijing (CN)

(72) Inventors: Xitong Ma, Beijing (CN); Yanfu Li, Beijing (CN); Ran Duan, Beijing (CN); Haiyan Wan, Beijing (CN)

(73) Assignee: BOE Technology Group Co., Ltd., Beijing (CN)

( * ) Notice: Subject to any disclaimer, the term of this patent is extended or adjusted under 35 U.S.C. 154(b) by 91 days.

(21) Appl. No.: 17/915,307

(22) PCT Filed: Feb. 2, 2021

(86) PCT No.: PCT/CN2021/074926
§ 371 (c)(1),
(2) Date: Sep. 28, 2022

(87) PCT Pub. No.: WO2021/196874
PCT Pub. Date: Oct. 7, 2021

(65) Prior Publication Data
US 2023/0144426 A1    May 11, 2023

(30) Foreign Application Priority Data
Mar. 31, 2020   (CN) .......................... 202010246199.1

(51) Int. Cl.
*H04N 5/06*    (2006.01)
*G09G 5/00*    (2006.01)

(52) U.S. Cl.
CPC .............. *H04N 5/06* (2013.01); *G09G 5/006* (2013.01); *G09G 2330/026* (2013.01)

(58) Field of Classification Search
CPC ..... H04N 5/06; G09G 5/006; G09G 2330/026
See application file for complete search history.

(56) References Cited

U.S. PATENT DOCUMENTS

| 2010/0280921 A1 | 11/2010 | Stone et al. |
| 2014/0366057 A1* | 12/2014 | Brockmann ....... H04N 21/4316 725/37 |
| 2017/0310830 A1 | 10/2017 | Kemmochi et al. |

FOREIGN PATENT DOCUMENTS

| CN | 101079308 A | 11/2007 |
| CN | 104299354 A | 1/2015 |
| CN | 107197182 A | 9/2017 |
| CN | 107209601 A | 9/2017 |

(Continued)

OTHER PUBLICATIONS

PCT/CN2021/074926 international search report.
(Continued)

*Primary Examiner* — Xin Sheng
(74) *Attorney, Agent, or Firm* — IPro, PLLC

(57) ABSTRACT

Provided is a monitor system. The monitor system comprises: a controlling module, configured to send human-machine interaction interface information and background picture information to a processing module via a same channel; the processing module, configured to receive video image information, perform processing on the video image information, the human-machine interaction interface information, and the background picture information, and output target image information to a display; and the display, configured to display the target image information.

18 Claims, 8 Drawing Sheets

(56) References Cited

FOREIGN PATENT DOCUMENTS

| | | | |
|---|---|---|---|
| CN | 109241465 A | | 1/2019 |
| CN | 110048825 A | * | 7/2019 |
| CN | 110087006 A | | 8/2019 |
| CN | 110597578 A | | 12/2019 |
| CN | 110706228 A | | 1/2020 |
| CN | 110913262 A | | 3/2020 |
| CN | 110933343 A | * | 3/2020 |
| CN | 111464783 A | | 7/2020 |
| KR | 101894405 B1 | | 9/2018 |

OTHER PUBLICATIONS

CN202010246199.1 first office action.
CN202010246199.1 Notification to grant patent right for invention.

* cited by examiner

MONITOR SYSTEM AND METHOD FOR CONTROLLING DISPLAYING THEREOF

CROSS-REFERENCE TO RELATED APPLICATION

The present application is a U.S. national phase application based on PCT/CN2021/074926, filed on Feb. 2, 2021, which is based on and claims priority to Chinese Patent Application No. 202010246199.1, filed with the China National Intellectual Property Administration on Mar. 31, 2020, and entitled as "MONITOR SYSTEM AND METHOD FOR CONTROLLING DISPLAYING THEREOF," all of which are hereby incorporated by reference in their entireties for all purposes.

TECHNICAL FIELD

The present disclosure relates to the field of monitor technologies, and more particularly to a monitor system and a method for controlling displaying thereof.

BACKGROUND

The application of a monitor system to broadcasting, medical treatment, and other fields has become more and more popular in recent years as the monitor system can replace a photographic film and provide a high-quality image. In general, for normal operation of the monitor system, it is essentially to process a background picture and other information required by a monitor function, so as to acquire and display an image that can be visually observed by combining with image information and background picture information captured by an external camera, realizing the control over the displaying of the monitor system.

SUMMARY

An object of the present disclosure is to solve one of the technical problems in the related art at least to some extent. Therefore, a first object of the present disclosure is to provide a monitor system for solving the technical problems of high cost, high structure design difficulty, and a low level of intelligence in the prior art.

A second object of the present disclosure is to provide a method for controlling displaying of a monitor system.

To realize the above objects, in a first aspect, a monitor system is provided according to an embodiment of the present disclosure. The monitor system includes: a controlling module, configured to send human-machine interaction interface information and background picture information to a processing module via a same channel; the processing module, configured to receive video image information, perform processing on the video image information, the human-machine interaction interface information, and the background picture information, and output target image information acquired after the processing to a display; and the display, configured to display the target image information.

In addition, the monitor system according to the above embodiment of the present disclosure may also have the following additional technical features.

Optionally, the processing module is particularly configured to: acquire a video image analysis result by analyzing the video image information, perform synchronization processing on the video image analysis result, the human-machine interaction interface information, and the background picture information, store a synchronized video image analysis result, synchronized human-machine interaction interface information, and synchronized background picture information which are acquired after the synchronization processing, perform synchronization processing on the video image information, store synchronized video image information acquired after the synchronization processing, perform superimposition processing on the synchronized video image analysis result, the synchronized human-machine interaction interface information, the synchronized background picture information, and the synchronized video image information, and output the target image information acquired after the superimposition processing to the display.

Optionally, the processing module is particularly configured to: send, in a time-sharing mode, the human-machine interaction interface information and the background picture information to the processing module via the same channel.

Optionally, the controlling module is particularly configured to: upon powering up, send first human-machine interaction interface information to the processing module; upon completion of sending the first human-machine interaction interface information, send the background picture information to the processing module; and upon completion of sending the background picture information, send corresponding second human-machine interaction interface information according to a received user instruction.

Optionally, the processing module includes: a first receiving unit, configured to receive the human-machine interaction interface information and the background picture information; a first writing controller, configured to write the human-machine interaction interface information into a first memory; a second writing controller, configured to write the background picture information into the first memory; a second receiving unit, configured to receive the video image information; a video image analyzing unit, configured to acquire the video image analysis result by analyzing the video image information; a third writing controller, configured to write the video image analysis result into the first memory; and the first memory, configured to perform synchronization processing on the video image analysis result, the human-machine interaction interface information, and the background picture information, and store the synchronized video image analysis result, the synchronized human-machine interaction interface information, and the synchronized background picture information which are acquired after the synchronization processing.

Optionally the processing module further includes: a fourth writing controller, configured to write the video image information into a second memory; and the second memory, configured to perform synchronization processing on the video image information, and store the synchronized video image information acquired after the synchronization processing.

Optionally, the processing module further includes: a first reading controller, configured to read the synchronized human-machine interaction interface information from the first memory; a second reading controller, configured to read the synchronized background picture information from the first memory; a third reading controller, configured to read the synchronized video image analysis result from the first memory; a fourth reading controller, configured to read the synchronized video image information from the second memory; an image superimposing unit, configured to perform superimposition processing on the read synchronized video image analysis result, synchronized human-machine interaction interface information, synchronized background picture information and synchronized video image information, and output the target image information acquired after the superimposition processing to a sending unit; and the sending unit, configured to send the target image information to the display.

Optionally, the controlling module is further configured to: send a first command to the processing module while sending the human-machine interaction interface information, and send a second command to the processing module while sending the background picture information; and the processing module further includes: a third receiving unit, configured to receive the first command and the second command; and a command detecting unit, configured to control the first writing controller to start working upon receiving the first command, and control the second writing controller to start working upon receiving the second command.

Optionally, the background picture information is pre-stored in the controlling module.

Optionally, a resolution of the video image information is 8 K.

In the first aspect, the monitor system is provided according to the embodiment of the present disclosure. In the monitor system, the background picture information is stored in the controlling module, such that after the controlling module sends the human-machine interaction interface information and the background picture information to the processing module via the same channel, the processing module can perform processing on the received video image information, human-machine interaction interface information, and background picture information, and send the target image information acquired after the processing to the display, thereby displaying the target image information on the display, and realizing control over the displaying of the monitor system, without a need to additionally provide an external device to store the background picture information. Thus, technical problems of high cost, high structure design difficulty, low control accuracy a low level of intelligence in a process of controlling the displaying of the monitor system in the prior art are avoided.

To achieve the above objects, in a second aspect, a method for controlling displaying of a monitor system is provided according to an embodiment of the present disclosure. The method includes: sending, by a controlling module, human-machine interaction interface information and background picture information to a processing module via a same channel; receiving, by the processing module, video image information, performing, by the processing module, processing on the video image information, the human-machine interaction interface information, and the background picture information, and outputting, by the processing module, target image information acquired after the processing to a display; and displaying, by the display, the target image information.

In the second aspect, the method for controlling the displaying of the monitor system is provided according to the embodiment of the present disclosure. In the monitor system, the background picture information is stored in the controlling module, such that after the controlling module sends the human-machine interaction interface information and the background picture information to the processing module via the same channel, the processing module can perform processing on the received video image information, human-machine interaction interface information, and background picture information, and send the target image information acquired after the processing to the display, thereby displaying the target image information on the display, and realizing control over the displaying of the monitor system, without a need to additionally provide an external device to store the background picture information. Thus, technical problems of high cost, high structure design difficulty, low control accuracy a low level of intelligence in a process of controlling the displaying of the monitor system in the prior art are avoided.

Additional aspects and advantages of the present disclosure will be partly given in the following description, and will be apparent from the following description or be appreciated from the practice of the present disclosure.

BRIEF DESCRIPTION OF THE DRAWINGS

The above and/or additional aspects and advantages of the present disclosure will be apparent and easy to understand from the description of the embodiments with reference to the accompanying drawings below, in the figures.

DETAILED DESCRIPTION

A description will be made in detail to the embodiments of the present disclosure, examples of which are illustrated in the accompanying drawings. The reference symbols which are the same or similar throughout the accompanying drawings represent the same or similar components or components with the same or similar functions. The embodiments described below with reference to the accompanying drawings are exemplary, and are intended to explain the present disclosure, rather than being interpreted as limitations to the present disclosure.

In the prior art, the background picture required by the monitor function is usually stored in an external storage device, and is called by a processing module from the external storage device when the background picture is needed. However, applicant found that when the displaying of the monitor system is controlled by the prior art, it is inevitable that there are technical problems such as extremely high system cost, a relatively complex system structure design, and a relatively low level of intelligence.

A monitor system and a method for controlling displaying thereof according to the embodiments of the present disclosure are described below with reference to the accompanying drawings.

FIGS. 1 to 7 are schematic structural diagrams of monitor systems according to the embodiments of the present disclosure.

Figure 1:
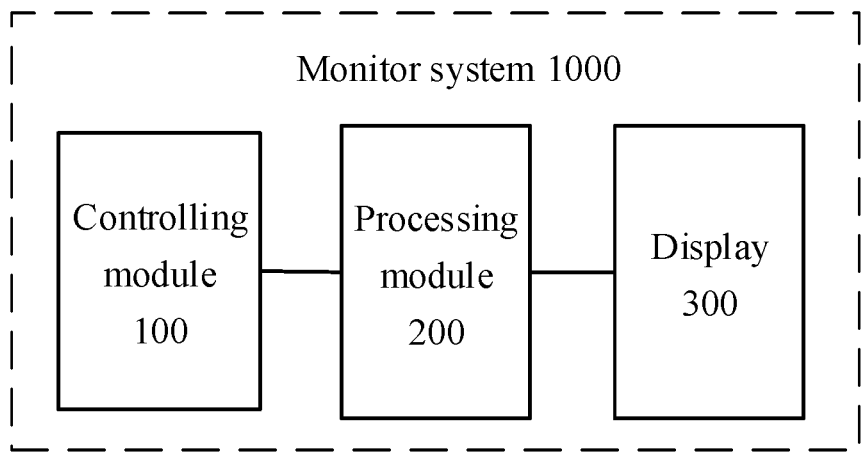
FIG. 1 is a schematic structural diagram of a monitor system according to an embodiment of the present disclosure.

It should be noted that as shown in FIG. 1, in the present disclosure, the monitor system 1000 includes a controlling module 100, a processing module 200, and a display 300.

The controlling module 100 is connected to the processing module 200, and is configured to send human-machine interaction interface information and background picture information to the processing module 200 via a same channel. Here, the human-machine interaction interface information and the background picture information are pre-stored in a storage region of the controlling module 100 per se. Upon powering up the monitor system 1000, the controlling module 100 automatically sends the stored human-machine interaction interface information and background picture information to the processing module 200 via a same low voltage differential signaling (LVDS) bus channel.

It should be noted that the human-machine interaction interface information and the background picture information may be set according to an actual situation. The human-machine interaction interface information includes: first human-machine interaction interface information and second human-machine interaction interface information. For example, the first human-machine interaction interface information may be set as power-on information of the monitor system 1000; the second human-machine interaction interface information may be set as other information sent based on a user instruction; and the background picture information may be set as relevant grid information. For example, the first human-machine interaction interface information may be set as a boot screen of the monitor system 1000, and the boot screen may include information such as a name, a trademark, and a version number of an operating system; the second human-machine interaction interface information may be set as an abnormal warning, displaying parameters, and other information; and the background picture information may be set as coordinate information.

It should be noted that, in the present disclosure, when the controlling module 100 attempts to send the human-machine interaction interface information and the background picture information to the processing module 200 via the same channel, a time-sharing mode can be used to send the information.

As a possible implementation, upon powering up the monitor system 1000, the controlling module 100 can acquire the first human-machine interaction interface information stored in its own storage region, and then send the acquired first human-machine interaction interface information to the processing module 200.

Further, upon sending the first human-machine interaction interface information to the processing module 200, the controlling module 100 may acquire the background picture information stored in its own storage region, and send the acquired background picture information to the processing module 200. The pre-stored background picture information may be set according to an actual situation.

Further, after the controlling module 100 sends the background picture information to the processing module 200, a user may input an instruction for sending the second human-machine interaction interface information via voice or a remote-control panel. After the user inputs the instruction for sending the second human-machine interaction interface information, the controlling module 100 may automatically respond to the instruction to send the corresponding second human-machine interaction interface information to the processing module 200.

It should be noted that when the controlling module 100 attempts to send the human-machine interaction interface information and the background picture information to the processing module 200 in the time-sharing mode, a sending sequence can also be adjusted according to an actual situation. Optionally, upon powering up, the controlling module 100 sends the background picture information to the processing module 200. Further, upon completion of sending the background picture information, the controlling module 100 sends the first human-machine interface interaction information to the processing module 200. Further, upon completion of sending the first human-machine interface interaction information, the controlling module 100 sends the second human-machine interface interaction information to the processing module 200.

It should be noted that, in the present disclosure, when the controlling module 100 attempts to send the human-machine interface interaction information and the background picture information to the processing module 200 via the same channel, the time-sharing mode is preferably adopted for sending. However, compared with the prior art, immediately sending the background picture information upon completion of sending the first human-machine interface interaction information cannot reduce the efficiency.

The processing module 200 is a processing core, is configured to receive the human-machine interaction interface information and the background picture information via one channel which are sent by the controlling module 100 and process the received human-machine interaction interface information and background picture information, and is further configured to receive video image information via another channel and process the received video image information.

Optionally, upon receiving the human-machine interaction interface information and background picture information, the processing module 200 performs synchronization processing on the received human-machine interaction interface information and background picture information, and stores the synchronized human-machine interaction interface information and background picture information in the storage region matched with the processing module 200, respectively.

Optionally, upon receiving the video image information, the processing module 200 acquires a video image analysis result by analyzing the received video image information. Further, the received video image information and the acquired video image analysis result are performed synchronization processing, and the synchronized video image information and video image analysis result are stored in the storage region matched with the processing module 200, respectively. Here, information contained in the video image analysis result may be set according to an actual situation. For example, it may be set that the video image analysis result contains histogram information, oscillogram information, vector graph information, and the like.

It should be noted that in order to ensure the definition of the displayed target image information, the video image information is high-definition image information with a resolution of 8 K.

It should be noted that, since a signal of the controlling module 100 and a signal of a sending module for video image information are different source signals, as mentioned above, the processing module 200 needs to perform frame synchronization processing on the information sent by the controlling module 100 and the information sent by the sending module for the video image information, so as to acquire relevant information after the synchronization processing.

Therefore, the synchronized human-machine interaction interface information, the synchronized background picture information, the synchronized video image information, and the synchronized video image analysis result are stored in the storage region of the processing module 200, respectively. Further, the processing module 200 extracts the synchronized human-machine interaction interface information, the synchronized background picture information, the synchronized video image information, and the synchronized video image analysis result from the storage region, and performs superimposition processing on the above synchronized human-machine interaction interface information, synchronized background picture information, synchronized video image information, and synchronized video image analysis result to acquire target image information after the superimposition processing.

The processing module 200 is further configured to send the acquired target image information to the display 300.

It should be noted that when the human-machine interaction interface information and the background picture information are transmitted between the controlling module 100 and the processing module 200, a virtual connection can be established via a handshake mechanism, to ensure the synchronization of information sending and receiving, and the reliability of information transmission.

As a possible implementation, upon powering up the monitor system 1000, the controlling module 100 sends the first human-machine interaction interface information to the processing module 200; and the processing module 200 receives and synchronizes the first human-machine interaction interface information, and then stores the synchronized first human-machine interaction interface information.

Further, upon completion of storing the first human-machine interaction interface information, that is, after no first human-machine interaction interface information is displayed, the processing module 200 feeds confirmation information back to the controlling module 100; upon receiving the confirmation information, the controlling module 100 sends the background picture information to the processing module 200 via the same channel; and the processing module 200 receives and synchronizes the background picture information, and then stores the synchronized background picture information.

Further, upon completion of storing the background picture information, the processing module 200 feeds confirmation information back to the controlling module 100. Upon receiving the confirmation information, the controlling module 100 sends the second human-machine interaction interface information to the processing module 200 via the same channel. The processing module 200 receives and synchronizes the second human-machine interaction interface information, and then stores the synchronized second human-machine interaction interface information.

A display 300 is connected to the processing module 200, and is configured to receive the target image information output by the processing module 200, so as to display the acquired target image information. Here, the display 300 may be selected according to an actual situation. For example, in order to enable the monitor system 1000 to display the target image information more clearly and improve the efficiency of the method for controlling the displaying of the monitor system, an 8 K TV with a resolution of 8 K may be preferably selected.

Figure 2:
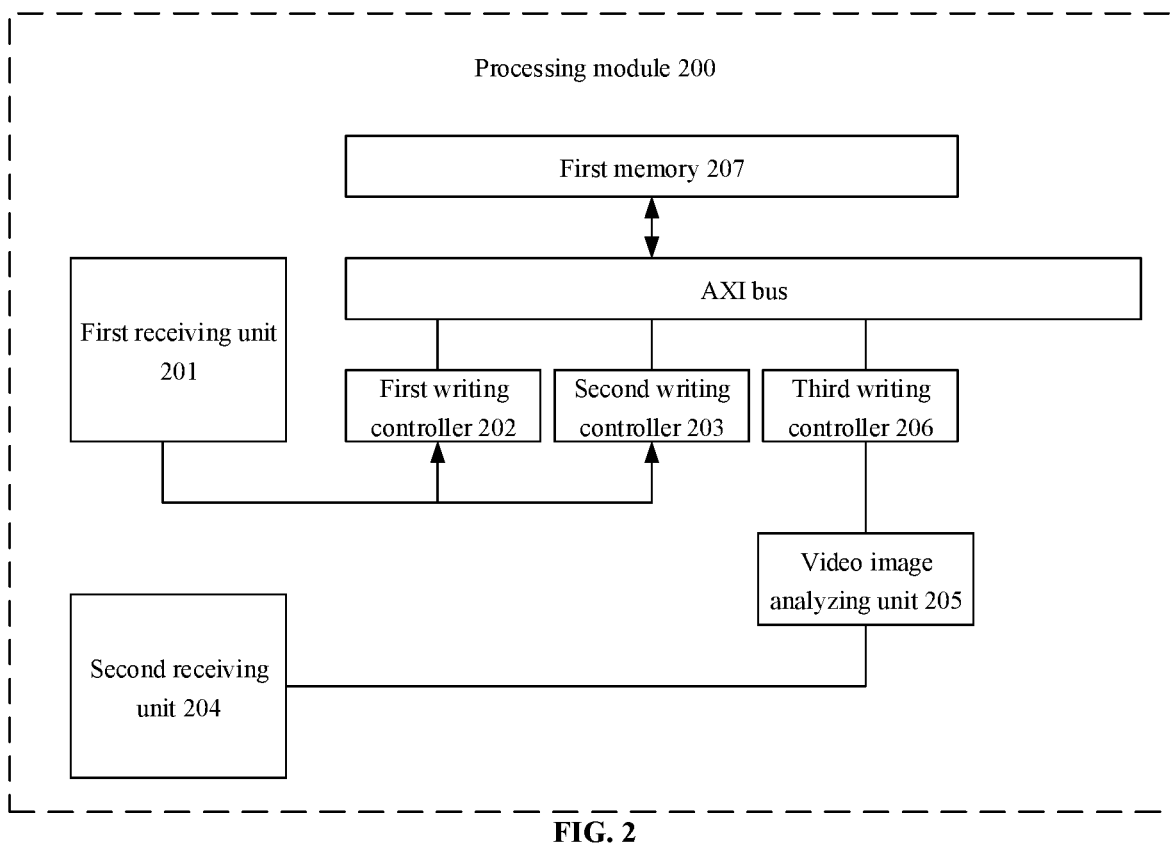
FIG. 2 is a schematic structural diagram of another monitor system according to an embodiment of the present disclosure.

In some embodiments, as shown in FIG. 2, the processing module 200 further includes: a first receiving unit 201, a first writing controller 202, a second writing controller 203, a second receiving unit 204, a video image analyzing unit 205, a third writing controller 206, and a first memory 207.

The first receiving unit 201 is a receiving channel for the human-machine interaction interface information and the background picture information, communicates with the controlling module 100 via the LVDS bus channel, and is configured to receive the human-machine interaction interface information and the background picture information which are sent by the controlling module 100.

The first writing controller 202 and the second writing controller 203 are both connected to the first receiving unit 201, and are configured to write the received human-machine interaction interface information and background picture information into the first memory 207, respectively. Here, the first writing controller 202 and the second writing controller 203 communicate with the first memory 207 via an advanced extensible interface (AXI) bus, so as to realize transmission of the human-machine interaction interface information and the background picture information between the writing controller and the first memory 207.

The second receiving unit 204 is a receiving channel for the video image information, communicates with the controlling module 100 via a serial digital interface (SDI) bus, and is configured to receive the video image information.

The video image analyzing unit 205 is connected to the second receiving unit 204, and is configured to acquire the video image analysis result by analyzing the received video image information. Further, the video image analyzing unit 205 is further configured to send the video image analysis result to the third writing controller 206.

The third writing controller 206 writes the received video image analysis result into the first memory 207. Here, the third writing controller 206 communicates with the first memory 207 via the AXI bus, so as to realize transmission of the video image analysis result between the third writing controller 206 and the first memory 207.

The first memory 207 is configured to perform synchronization processing on the video image analysis result, the human-machine interaction interface information, and the background picture information, and store the synchronized video image analysis result, the synchronized human-machine interaction interface information, and the synchronized background picture information which are acquired after the synchronization processing. Here, the first memory 207 may be selected according to an actual situation. For example, in order to reduce the energy consumption of the monitor system 1000 and improve the information transmission efficiency, a double-data-rate 3 synchronous dynamic RAM (DDR3) better in power saving and higher in transmission efficiency may preferably be selected.

Figure 3:
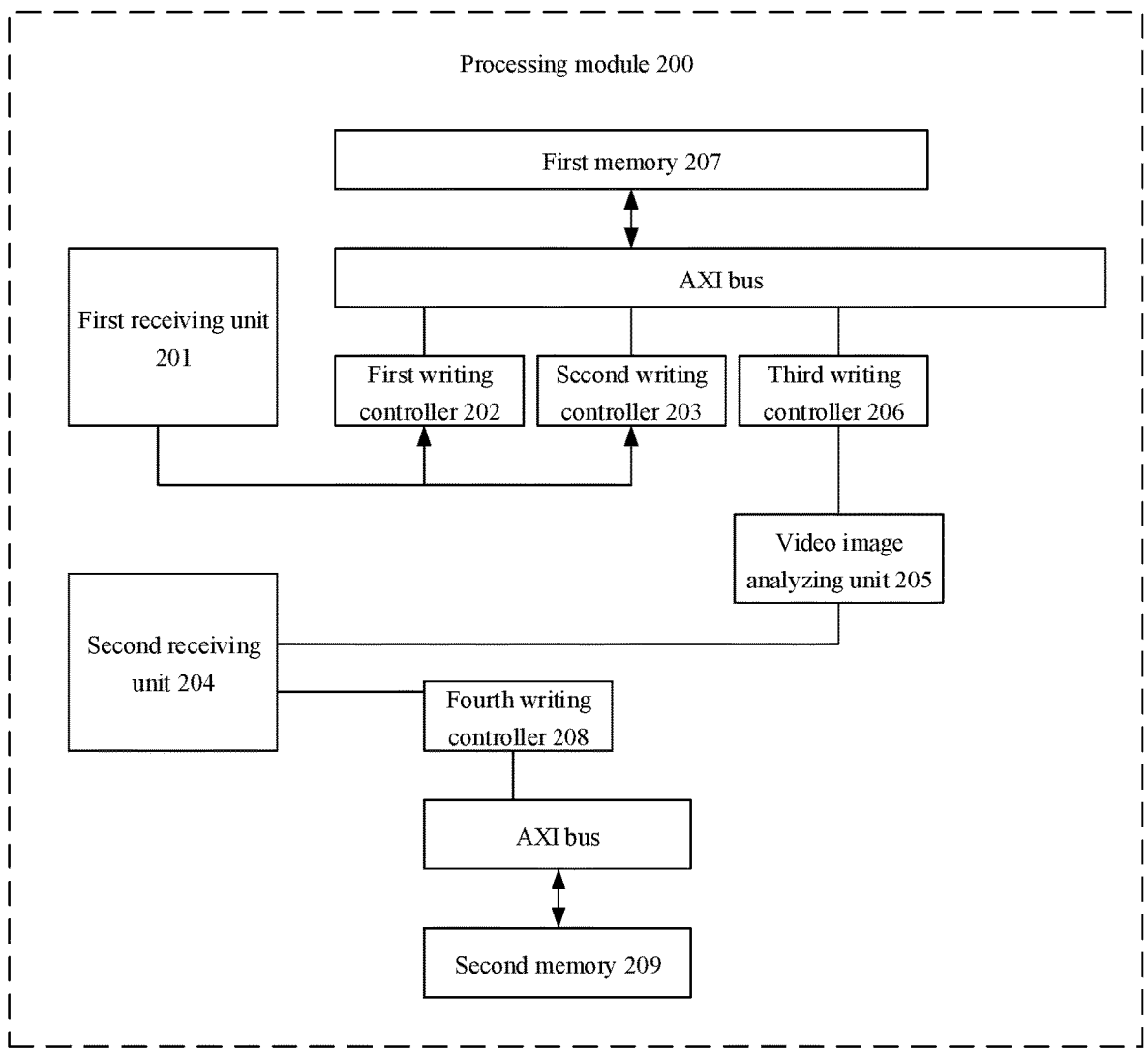
FIG. 3 is a schematic structural diagram of another monitor system according to an embodiment of the present disclosure.

In some embodiments, as shown in FIG. 3, the processing module 200 further includes a fourth writing controller 208 and a second memory 209.

The fourth writing controller 208 writes the received video image information into the second memory 209. Here, the fourth writing controller 208 communicates with the second memory 209 via the AXI bus, so as to realize transmission of the video image information between the fourth writing controller 208 and the second memory 209.

The second memory 209 is configured to perform synchronization processing on the video image information and store synchronized video image information acquired after the synchronization processing. Here, the second memory 209 may be selected according to an actual situation. For example, the DDR3 is preferred.

Figure 4:
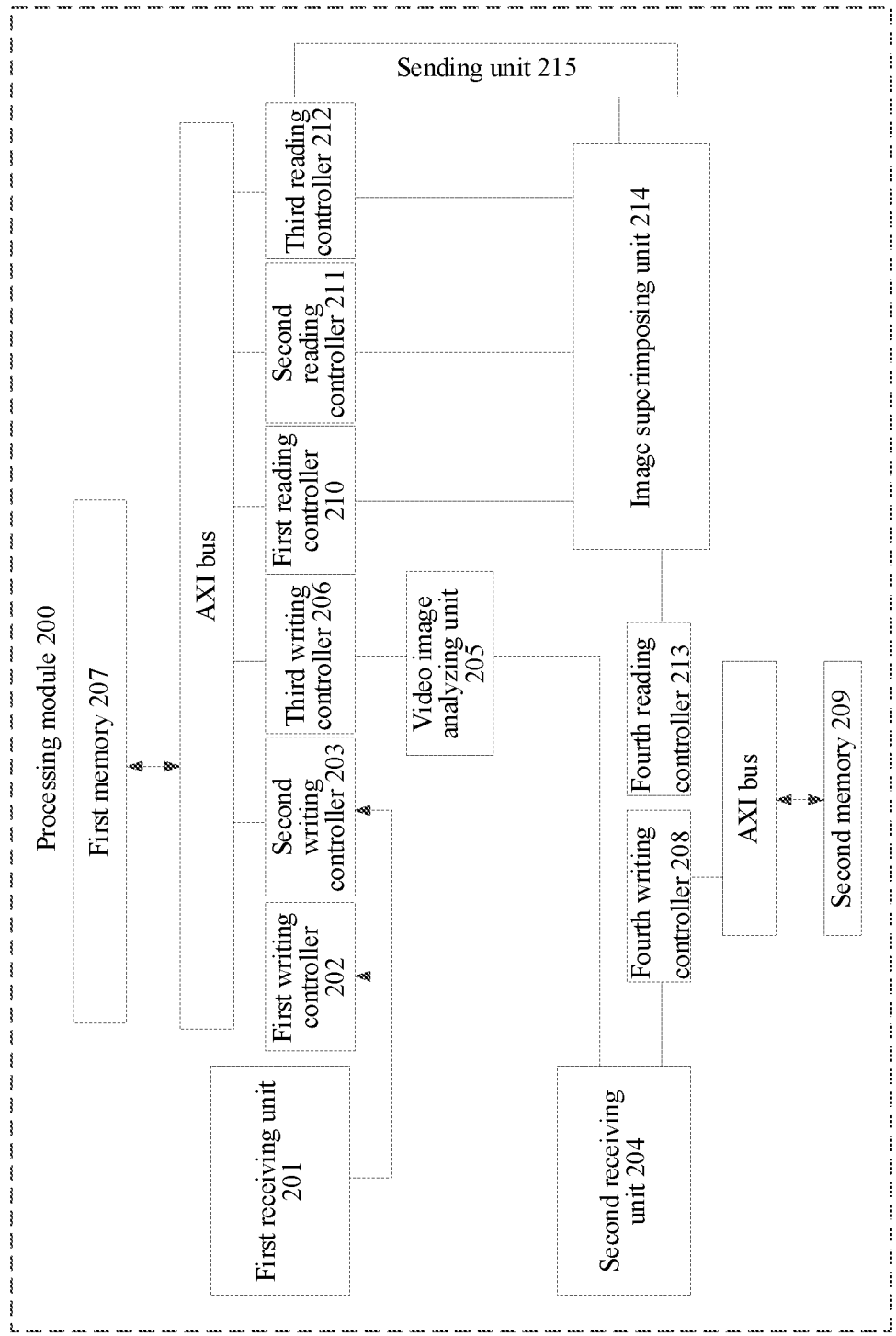
FIG. 4 is a schematic structural diagram of another monitor system p according to an embodiment of the present disclosure.

In some embodiments, as shown in FIG. 4, the processing module 200 further includes: a first reading controller 210, a second reading controller 211, a third reading controller 212, a fourth reading controller 213, an image superimposing unit 214, and a sending unit 215.

The first reading controller 210 communicates with the first memory 207 via the AXI bus, and is configured to read the synchronized human-machine interaction interface information from the first memory 207. The second reading controller 211 communicates with the first memory 207 via the AXI bus, and is configured to read the synchronized background picture information from the first memory 207. The third reading controller 212 communicates with the first memory 207 via the AXI bus, and is configured to read the synchronized video image analysis result from the first memory 207. The fourth reading controller 213 communicates with the second memory 209 via the AXI bus, and is configured to read the synchronized video image information from the second memory 209. Further, the first fourth reading control to the fourth reading controller send the read synchronized video image analysis result, synchronized human-machine interaction interface information, synchronized background picture information, and synchronized video image information to the image superimposing unit 214.

The image superimposing unit 214 is connected to the sending unit 215, and is configured to acquire the target image information by performing synchronization processing on the synchronized video image analysis result, the synchronized human-machine interaction interface information, the synchronized background picture information, and the synchronized video image information which are read by the reading controllers.

The image superimposing unit 214 is further configured to output the target image information acquired after the synchronization processing to the sending unit 215.

It should be noted that, in the present disclosure, there is no limitation on the way of superimposing information, and it may be selected according to an actual situation. Optionally, the synchronized human-machine interaction interface information, the synchronized background picture information, the synchronized video image information, and the synchronized video image analysis result may be added at the pixel level.

The sending unit 215 communicates with the display 300 via a high-definition digital display (V By One (VOB)) bus, and is configured to send the target image information to the display 300.

Figure 5:
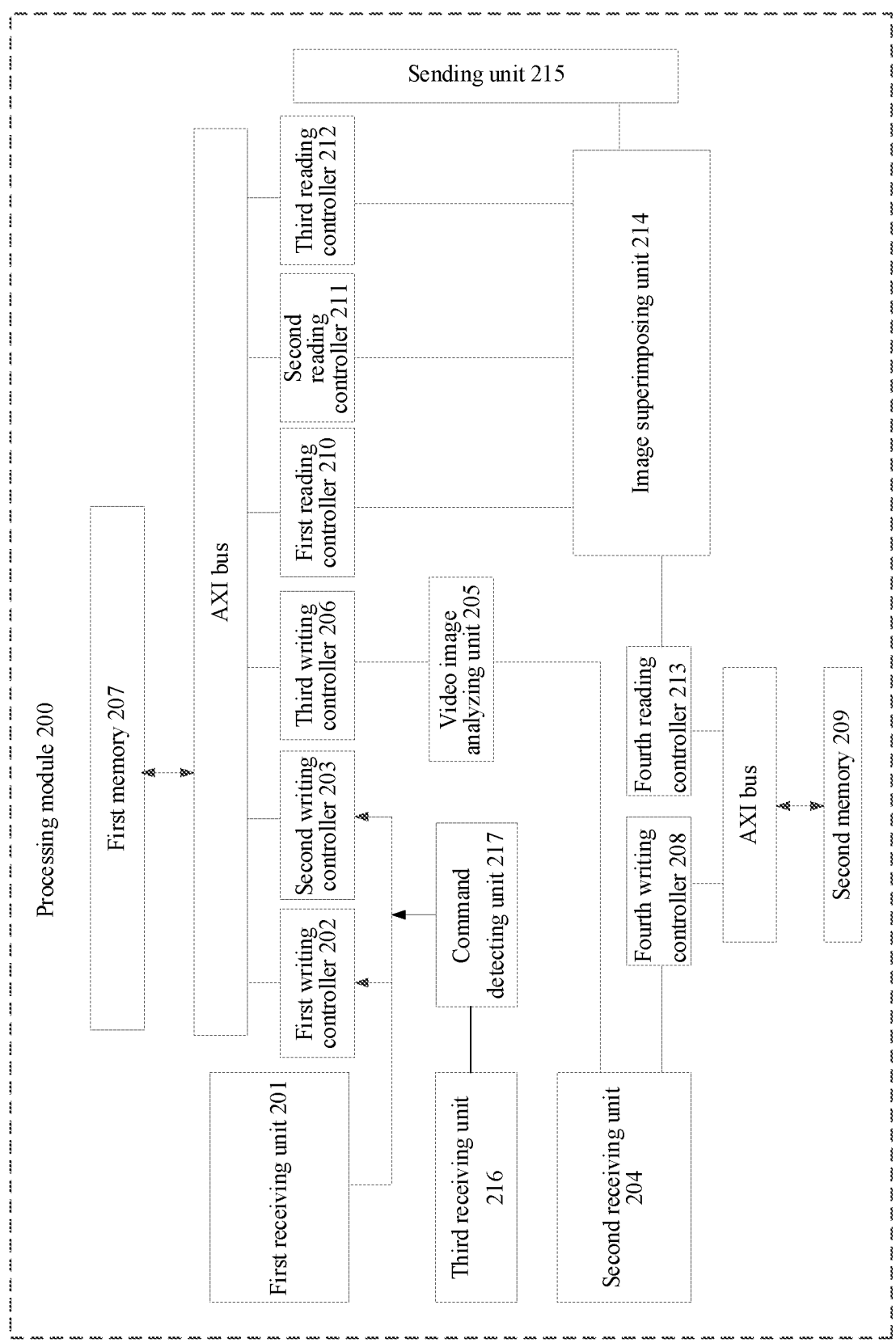
FIG. 5 is a schematic structural diagram of another monitor system according to an embodiment of the present disclosure.

In some embodiments, as shown in FIG. 5, the processing module 200 further includes a third receiving unit 216 and a command detecting unit 217.

It should be noted that since the controlling module can send the human-machine interface interaction information and the background picture information via the same channel in the time-sharing mode, in order to enable different writing controllers to match different pieces of received information, the controlling module 100 sends different commands to the processing module while sending the human-machine interface interaction information and the background picture information.

Optionally, the controlling module 100 sends a first command to the processing module 200 while sending the human-machine interaction interface information to the processing module 200; and the controlling module 100 sends a second command to the processing module 200 while sending the background picture information to the processing module 200. Here, the human-machine interaction interface information includes first human-machine interaction interface information and second human-machine interaction interface information.

A third receiving unit 216 communicates with the controlling module 100 via an inter-integrated circuit (IIC), and is configured to receive the first command and the second command sent by the controlling module 100.

The command detecting unit 217 is connected to the third receiving unit 216, and is configured to recognize a received command and control a matched writing controller to work based on a recognition result. In the case that the received command is recognized as the first command, the first writing controller 202 may be controlled to start working; and in the case that the received command is recognized as the second command, the second writing controller 203 may be controlled to start working.

Figure 6:
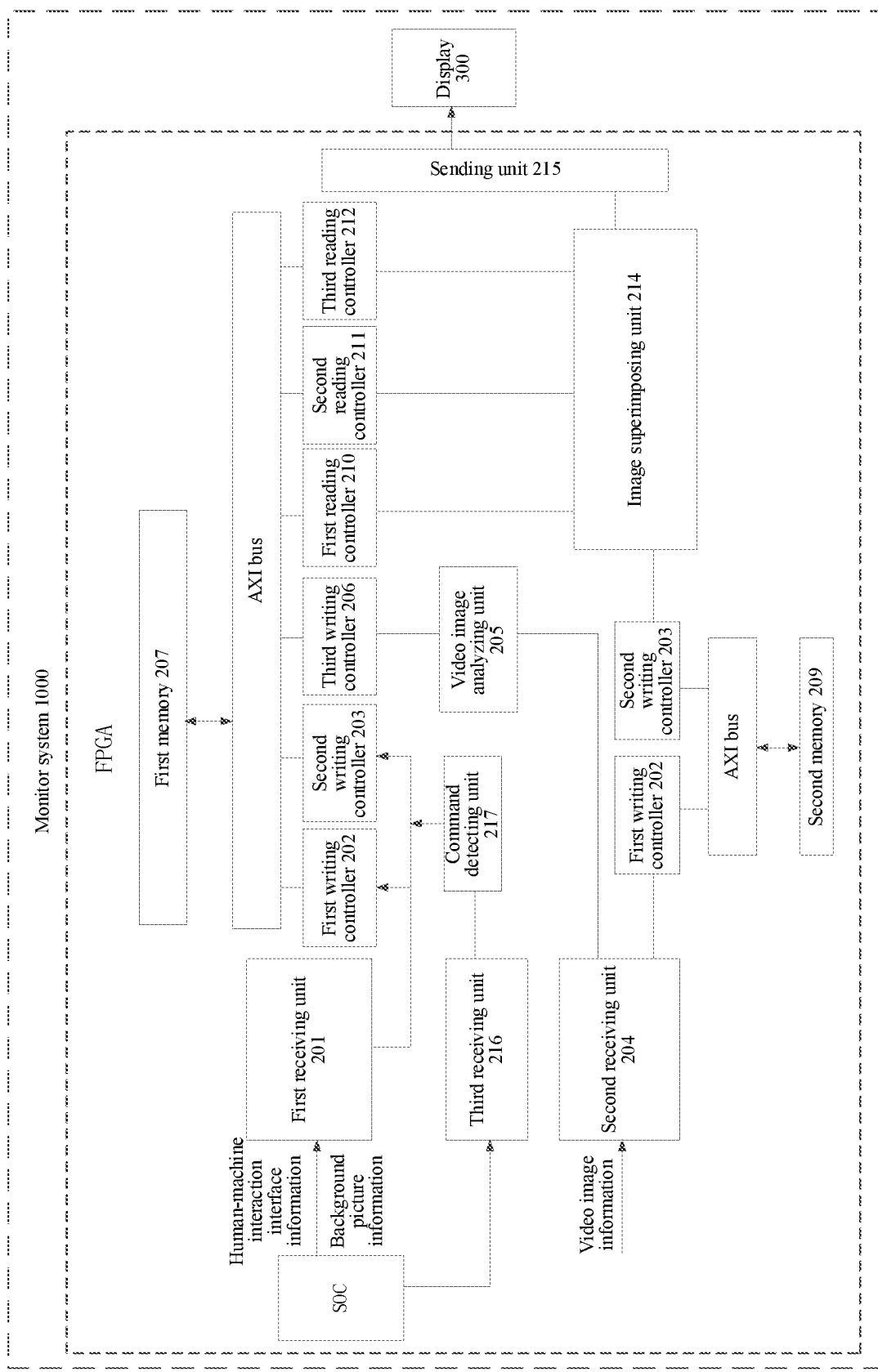
FIG. 6 is a schematic structural diagram of another monitor system according to an embodiment of the present disclosure.
Figure 7:
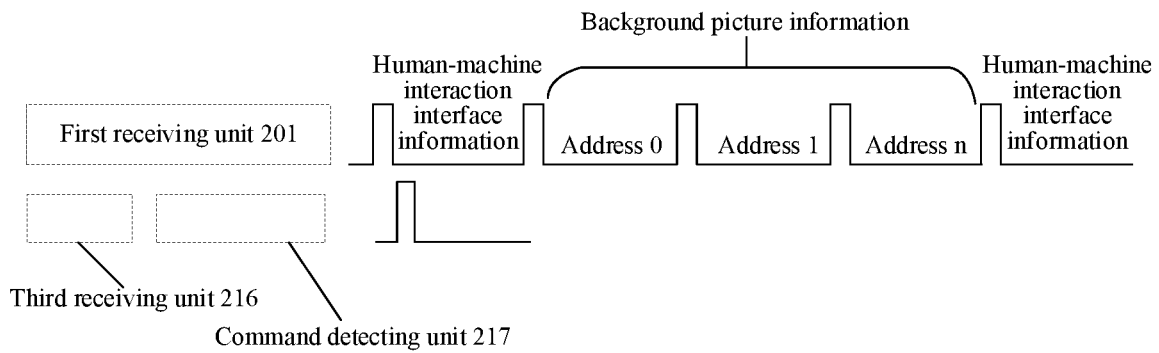
FIG. 7 is a loading sequence diagram of human-machine interaction interface information and background picture information according to an embodiment of the present disclosure.

It should be noted that, as shown in FIG. 6, in the present disclosure, the controlling module 100 is preferably a system on chip (SOC), and the processing module 200 is preferably a field programmable gate array (FPGA), such that the monitor system provided by the present disclosure can store the background picture information in the SOC, acquire the target image information by processing relevant information through two boards of the SOC and the FPGA, and then, display the target image information on the display, realizing the control over the displaying of the monitor system. Here, a loading sequence of the human-machine interaction interface information and the background picture information is as shown in FIG. 7.

As a possible implementation, upon powering up the monitor system 1000, the SOC sends the stored first human-machine interaction interface information to the first receiving unit 201, and simultaneously sends a first command to the command detecting unit 217. Upon receiving the first command, the command detecting unit 217 controls the first writing controller 202 to work to write the first human-machine interaction interface information received by the first receiving unit 217 into the first memory 207. Upon completion of storing the first human-machine interaction interface information, the SOC sends the stored background picture information to the first receiving unit 201 via the same channel, and simultaneously sends a second command to the command detecting unit 217. Upon receiving the second command, the command detecting unit 217 controls the second writing controller 203 to work to write the background picture information received by the first receiving unit into the first memory 207. Upon completion of storing the background picture information, the SOC sends the stored second human-machine interaction interface information to the first receiving unit 201 via the same channel, and simultaneously sends the first command to the command detecting unit 217. Upon receiving the first command, the command detecting unit 217 controls the first writing controller 202 to work to write the second human-machine interaction interface information received by the first receiving unit into the first memory 207.

Further, the second receiving unit 204 receives video image information and sends the received video image information to the video image analyzing unit 205 to analyze the video image information. The video image analyzing unit 205 sends a video image information analysis result to the third writing controller 206 to write the video image analysis result into the first memory 207 via the third writing controller 206. Meanwhile, the second receiving unit 204 sends the received video image information to the fourth writing controller 208, such that the fourth writing controller 208 can write the video image information into the second memory 209.

Further, the first reading controller 210 to the third reading controller 212 respectively read the synchronized human-machine interaction interface information, the synchronized background picture information, and the synchronized video image analysis result from the first memory 207, and send the read synchronized human-machine interaction interface information, synchronized background picture information, and synchronized video image analysis result to the image superimposing unit 214. The fourth reading controller 213 reads the synchronized video image information from the second memory 209 and sends the read synchronized video image information to the image superimposing unit 214.

Further, the image superimposing unit 214 acquires target image information by performing superimposition processing on the received synchronized human-machine interaction interface information, synchronized background picture information, synchronized video image analysis result, and synchronized video image information, and sends the target image information to the sending unit 215. The sending unit 215 sends the received target image information to the display 300.

In summary, in the monitor system provided by the present disclosure, the background picture information is stored in the controlling module, such that after the controlling module sends the human-machine interaction interface information and the background picture information to the processing module via the same channel, the processing module can perform processing on the received video image information, human-machine interaction interface information, and background picture information, and send the target image information acquired after the processing to the display, thereby displaying the target image information on the display, and realizing control over the displaying of the monitor system, without a need to additionally provide an external device to store the background picture information. Thus, technical problems of high cost, high structure design difficulty, low control accuracy, and a low level of intelligence in a process of controlling the displaying of the monitor system in the prior art are avoided.

It should be noted that in the method for controlling the displaying of the monitor system provided by the present disclosure, based on characteristics of single writing and repeated reading of the background picture information, the background picture information is pre-stored in the controlling module, such that after the initial operation of the monitor system upon powering up, the controlling module can send the human-machine interaction interface information and the background picture information stored in its own storage region to the processing module via the same channel; the processing module performs frame synchronizing on the received human-machine interaction interface information and background picture information as well as the video image information sent by another different source signal, and acquires the target image information by superimposing the synchronized relevant information; and finally, the target image information is displayed on the display.

Figure 8:
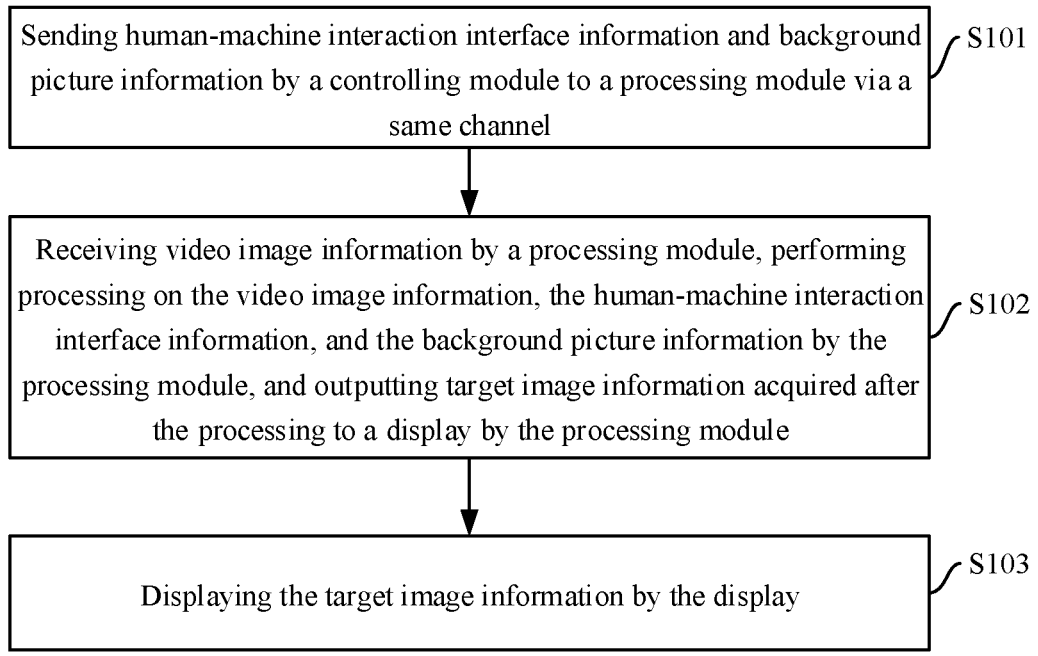
FIG. 8 is a schematic flowchart of a method for controlling displaying of a monitor system according to an embodiment of the present disclosure.

FIG. 8 is a schematic flowchart of a method for controlling displaying of a monitor system according to an embodiment of the present disclosure. As shown in FIG. 8, the method particularly includes the following steps.

In S101, human-machine interaction interface information and background picture information are sent by a controlling module to a processing module via a same channel.

Optionally, upon powering up the monitor system, the controlling module sends the human-machine interaction interface information and the background picture information stored in its own storage region to a first receiving unit in the processing module via the same channel. Here, the human-machine interaction interface information includes first human-machine interaction interface information and second human-machine interaction interface information; and the first human-machine interaction interface information, the second human-machine interaction interface information, and the background picture information may be set according to an actual situation. For example, the first human-machine interaction interface information may be set as a boot screen; the second human-machine interaction interface information may be set as an abnormal warning; and the background picture information may be set as coordinate information.

In S102, video image information is received by the processing module, the video image information, the human-machine interaction interface information, and the background picture information are performed processing by the processing module, and target image information acquired after the processing is output by the processing module to a display.

Figure 9:
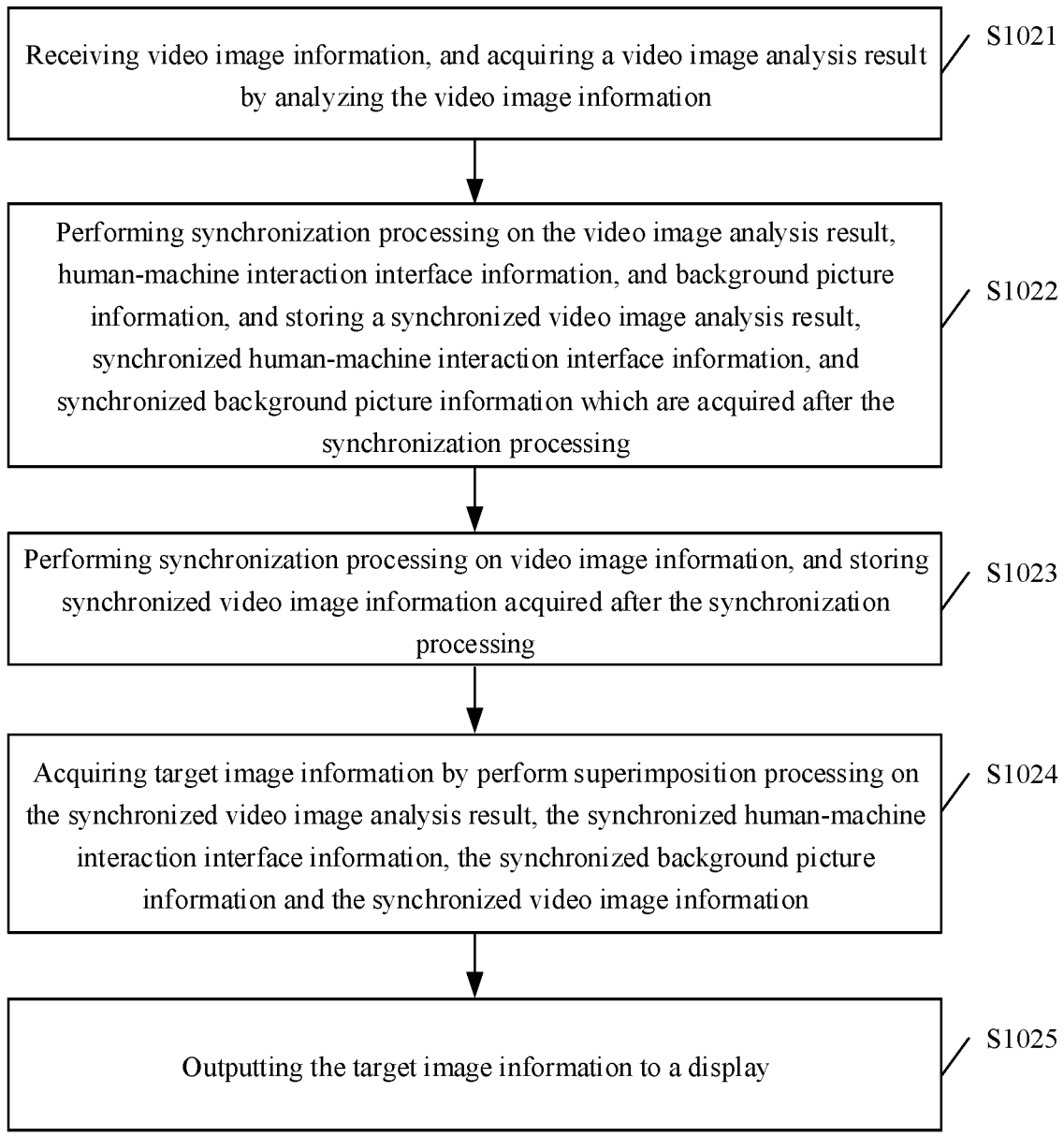
FIG. 9 is a schematic flowchart of another method for controlling displaying of a monitor system according to an embodiment of the present disclosure.

As a possible implementation, as shown in FIG. 9, S102 particularly includes the following steps.

In S1021, the video image information is received, and a video image analysis result is acquired by analyzing the video image information.

Optionally, the second receiving unit receives the video image information and sends the received video image information to a video image analyzing unit. Further, the video image analyzing unit acquires the video image analysis result by analyzing the received video image information, and sends the video image analysis result to a third writing controller. Here, the video image information is high-definition image information with a resolution of 8 K.

It should be noted that information contained in the video image analysis result may be set according to an actual situation. For example, it may be set that the video image analysis result contains histogram information, oscillogram information, vector graph information, and the like.

In S1022, the video image analysis result, the human-machine interaction interface information, and the background picture information are performed synchronization processing, and a synchronized video image analysis result, synchronized human-machine interaction interface information, and synchronized background picture information which are acquired after the synchronization processing are stored.

Optionally, a first writing controller, a second writing controller, and the third writing controller write the received human-machine interface interaction information, background picture information, and video image analysis result into a first memory, respectively. Here, the human-machine interaction interface information includes first human-machine interaction interface information and second human-machine interaction interface information.

In S1023, video image information is performed synchronization processing, and synchronized video image information acquired after the synchronization processing is stored.

Optionally, upon receiving the video image information, the second receiving unit sends the video image information to a fourth writing controller, such that the fourth writing controller writes the received video image information into a second memory.

In S1024, target image information is acquired by performing superimposition processing on the synchronized video image analysis result, the synchronized human-machine interaction interface information, the synchronized background picture information, and the synchronized video image information.

Optionally, a first reading controller, the second reading controller, and a third reading controller read the synchronized human-machine interaction interface information, the synchronized background picture information, and the synchronized video image analysis result from the first memory, respectively, and send the read synchronized human-machine interaction interface information, synchronized background picture information and synchronized video image analysis result to the image superimposing unit. The fourth reading controller reads the synchronized video image information from the second memory, and sends the read synchronized video image information to the image superimposing unit.

Further, the image superimposing unit performs superimposition processing on the received synchronized human-machine interaction interface information, synchronized background picture information, synchronized video image analysis result, and synchronized video image information, and thus, acquires target image information acquired after the superimposition processing.

For example, after the synchronized human-machine interaction interface information, the synchronized background picture information, the synchronized video image information, and the synchronized video image analysis result are acquired, the target image information acquired after the superimposition processing can be calculated according to an equation of $Imagep=k1*Image1+k2*Image2+k3*Image3+k4*Image4$. Here, Imagep represents the target image information after the superimposition processing; Image1 represents the synchronized human-machine interaction interface information; Image2 represents the synchronized background picture information; Image3 represents the synchronized video image information; Image4 represents the synchronized video image analysis result; and K1 to K4 represent parameters of the synchronized human-machine interaction interface information, the synchronized background picture information, the synchronized video image information, and the synchronized video image analysis result, respectively, and may be any real number. Optionally, $k1+k2+k3+k4=1$.

In S1025, the target image information is output to a display.

Optionally, the image superimposing unit sends the target image information to the sending unit, and the sending unit sends the received target image information to the display.

In S103, the target image information is displayed by the display.

Optionally, the display displays the target image information upon receiving the target image information sent by the sending unit.

Therefore, in the method for controlling the displaying of the monitor system provided by the present disclosure, the background picture information is stored in the controlling module, such that after the controlling module sends the human-machine interaction interface information and the background picture information to the processing module via the same channel, the processing module can perform processing on the received video image information, human-machine interaction interface information, and background picture information, and send the target image information acquired after the processing to the display, thereby displaying the target image information on the display, and realizing control over the displaying of the monitor system, without a need to additionally provide an external device to store the background picture information. Thus, technical problems of high cost, high structure design difficulty, low control accuracy, and a low level of intelligence in a process of controlling the displaying of the monitor system in the prior art are avoided.

It should be noted that when the human-machine interaction interface information and the background picture information are transmitted between the controlling module and the processing module, a virtual connection can be established via a handshake mechanism, to ensure the synchronization of information sending and receiving, and the reliability of information transmission.

For example, upon powering up the monitor system, the controlling module sends a boot screen to the processing module; and the processing module receives and synchronizes the boot screen, and then stores the synchronized boot screen. Further, upon completion of storing the boot screen, that is, after no boot screen is displayed, the processing module feeds confirmation information back to the controlling module; upon receiving the confirmation information, the controlling module sends the background picture information to the processing module via the same channel; and the processing module receives and synchronizes the background picture information, and then stores the synchronized background picture information. Further, upon completion of storing the background picture information, the processing module feeds confirmation information back to the controlling module; and upon receiving the confirmation information, the controlling module sends second human-machine interaction information to the processing module via the same channel, and the processing module receives and synchronizes the second human-machine interaction information, and then stores the synchronized second human-machine interaction information.

Therefore, the method for controlling the displaying of the monitor system provided by the present disclosure can ensure the reliability of information transmission by establishing the handshake mechanism when the controlling module tries to send the human-machine interaction interface information and the background picture information to the processing module via the same channel, such that the control accuracy of the method for controlling the displaying of the monitor system provided by the present disclosure is improved.

Figure 10:
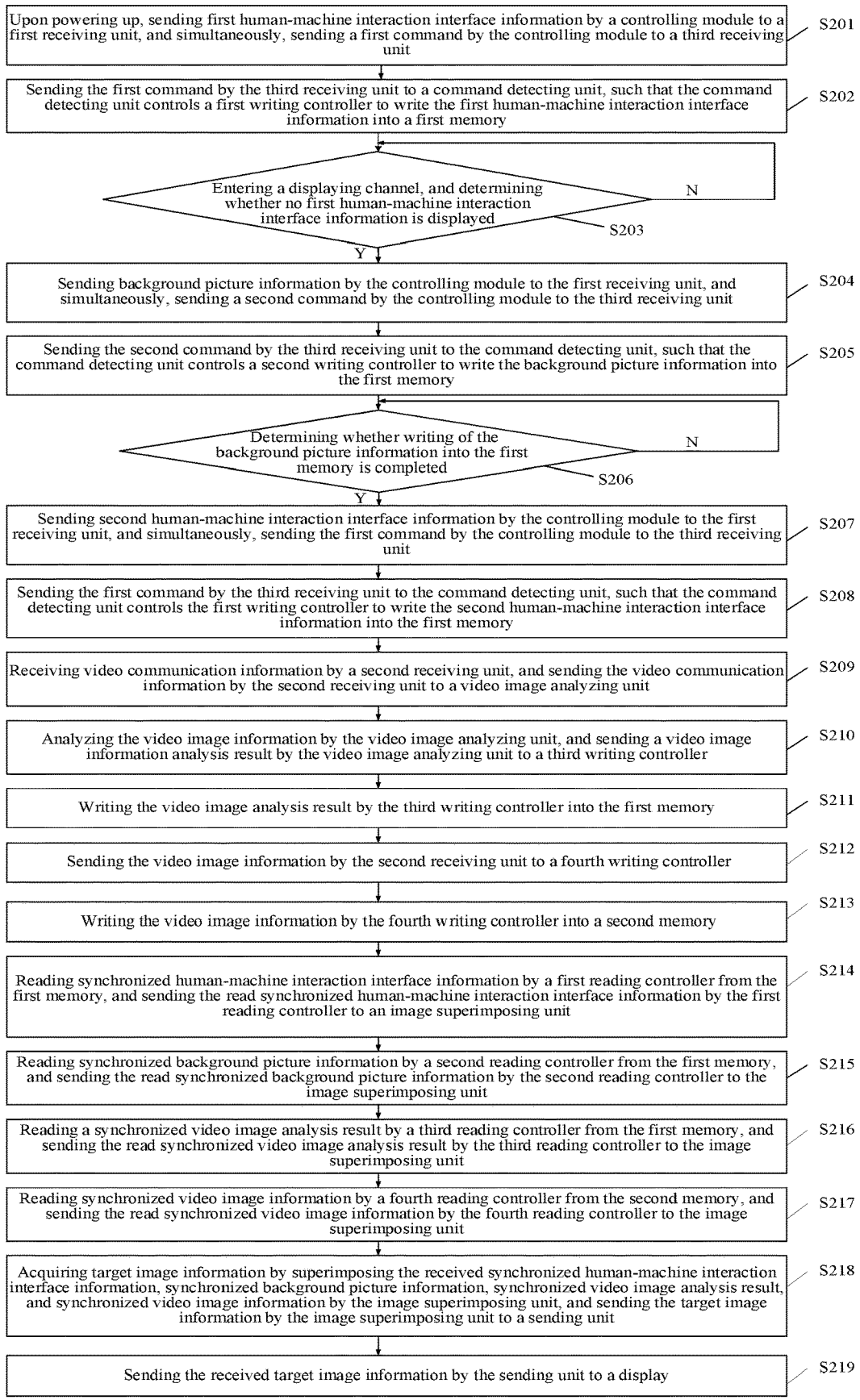
FIG. 10 is a schematic flowchart of another method for controlling displaying of a monitor system according to an embodiment of the present disclosure.

As a possible implementation, as shown in FIG. 10, the method particularly includes the following steps.

In S201, upon powering up, first human-machine interaction interface information is sent by a controlling module to a first receiving unit, and simultaneously, a first command is sent by the controlling module to a third receiving unit.

In S202, the first command is sent by the third receiving unit to a command detecting unit, such that the command detecting unit controls a first writing controller to write the first human-machine interaction interface information into a first memory.

In S203, a displaying channel is entered, and whether no first human-machine interaction interface information is displayed is determined.

Optionally, in the case that it is recognized that no first human-machine interaction interface information is displayed, S204 may be executed; and in the case that it is recognized that the first human-machine interaction interface information is still displayed, determining whether no first human-machine interaction interface information is displayed can be continued.

In S204, background picture information is sent by the controlling module to the first receiving unit, and simultaneously, a second command is sent by the controlling module to the third receiving unit.

In S205, the second command is sent by the third receiving unit to the command detecting unit, such that the command detecting unit controls a second writing controller to write the background picture information into the first memory.

In S206, whether writing of the background picture information into the first memory is completed is determined.

Optionally, in the case that it is recognized that the writing of the background picture information into the first memory is completed, step S205 may be executed; and in the case that it is recognized that the writing of the background picture information into the first memory is not completed, determining whether the writing of the background picture information into the first memory can be continued.

In S207, second human-machine interaction interface information is sent by the controlling module to the first receiving unit, and simultaneously, the first command is sent by the controlling module to the third receiving unit.

Here, the controlling module sends the first human-machine interaction interface information, the background picture information, and the second human-machine interaction interface information via the same LVDS bus channel.

In S208, the first command is sent by the third receiving unit to the command detecting unit, such that the command detecting unit controls the first writing controller to write the second human-machine interaction interface information into the first memory.

In S209, video communication information is received by a second receiving unit, and is sent by the second receiving unit to a video image analyzing unit.

In S210, the video image information is analyzed by the video image analyzing unit, and a video image information analysis result is sent by the video image analyzing unit to a third writing controller.

In S211, the video image analysis result is written by the third writing controller into the first memory.

In S212, the video image information is sent by the second receiving unit to a fourth writing controller.

In S213, the video image information is written by the fourth writing controller into a second memory.

In S214, synchronized human-machine interaction interface information is read by a first reading controller from the first memory, and is sent by the first reading controller to an image superimposing unit.

Here, the human-machine interaction interface information includes the first human-machine interaction interface information and the second human-machine interaction interface information.

In S215, synchronized background picture information is read by a second reading controller from the first memory, and is sent by the second reading controller to the image superimposing unit.

In S216, a synchronized video image analysis result is read by a third reading controller from the first memory, and is sent by the third reading controller to the image superimposing unit.

In S217, synchronized video image information is read by a fourth reading controller from the second memory, and is sent by the fourth reading controller to the image superimposing unit.

In S218, target image information is acquired by superimposing the received synchronized human-machine interaction interface information, synchronized background picture information, synchronized video image analysis result, and synchronized video image information by the image superimposing unit, and is sent by the image superimposing unit to a sending unit.

In S219, the received target image information is sent by the sending unit to a display.

It should be noted that in the present disclosure, the controlling module is preferably the SOC, and the processing module is preferably the FPGA.

It should be noted that the introduction of S201 to S219 may refer to the relevant records in the above-mentioned embodiments, and details thereof are not repeated herein.

Therefore, in the method for controlling the displaying of the monitor system provided by the present disclosure, the background picture information is stored in the controlling module, such that after the controlling module sends the human-machine interaction interface information and the background picture information to the processing module via the same channel, the processing module can perform processing on the received video image information, human-machine interaction interface information, and background picture information, and send the target image information acquired after the processing to the display, thereby displaying the target image information on the display, and realizing control over the displaying of the monitor system, without a need to additionally provide an external device to store the background picture information. Thus, technical problems of high cost, high structure design difficulty, low control accuracy, and a low level of intelligence in a process of controlling the displaying of the monitor system in the prior art are avoided.

It should be understood that various portions of the present invention may be implemented by hardware, software, firmware, or a combination thereof. In the above embodiments, a plurality of steps or methods may be implemented in software or firmware stored in the memory and executed by a suitable instruction execution system. For example, in the case that the plurality of steps or methods are implemented in hardware, like the implementation in another embodiment, the plurality of steps or methods may be implemented by using any one or a combination of the following techniques well known in the art, and the techniques comprise: a discrete logic circuit provided with a logic gate circuit configured to realize logic functions of data signals, an application-specific integrated circuit having a suitable combinational logic gate circuit, a programmable gate array (PGA), a field programmable gate array (FPGA), and the like.

In addition, in the description of the present disclosure, it should be understood that orientations or position relationships indicated by the terms "center," "longitudinal," "transverse," "length," "width," "thickness," "upper," "lower," "front," "rear," "left," "right," "vertical," "horizontal," "top," "bottom," "internal," "external," "clockwise," "anticlockwise," "axial," "radial," "circumferential," and the like are those based on the drawings, and are merely configured to describe the present disclosure conveniently and simplify the description, rather than indicating or implying that the referred device or element has a specific orientation and is configured and operated at the specific orientation. Therefore, they should not be construed as limiting the present disclosure.

Moreover, the terms "first" and "second" are only for the purpose of description and should not be construed as indicating or implying relative importance or implicitly indicating the number of technical features indicated. Thus, features defined with "first" and "second" may explicitly or implicitly comprise at least one of the features. In the description of the present invention, "a plurality of/multiple" means at least two, for example, two, three, or the like, unless otherwise particularly defined.

In the description of the embodiments of the present disclosure, it should be noted that the terms "mounted," "connected with," "connected to," "fixed" and the like should be broadly understood unless explicitly defined or limited otherwise. For example, they may refer to a fixed connection, detachable connection, or integrated connection, or may be a mechanical connection or electrical connection, or may refer to a direct connection or an indirect connection via an intermediary, or may be an internal communication of two elements, unless otherwise particularly defined. Those skilled in the art can understand the specific meaning of the above terms in the present disclosure in accordance with specific conditions.

In the present disclosure, unless explicitly defined or limited otherwise, the first feature "above" or "below" the second feature may be direct contact between the first feature and the second feature, or the indirect contact between the first feature and second feature via an intermediary. In addition, the first feature is "over", "above" and "on" the second feature maybe that the first feature is directly or obliquely above the second feature, or only indicates that the horizontal height of the first feature is higher than that of the second feature. The first feature "under," "below," and "underneath" the second feature may be that the first feature is directly or obliquely below the second feature, or only indicates that the horizontal height of the first feature is lower than that of the second feature.

In the description, content described in a reference term "one embodiment," "some embodiments," "an example," "a particular example," "some examples," or the like means particular features, structures, materials, or characteristics described in combination with the embodiment or example are included in at least one embodiment or example of the present disclosure. In this description, the schematic representation of the terms does not necessarily refer to the same embodiment or example. Furthermore, the described specific features, structures, materials, or characteristics may be combined in any suitable manner in any one or more embodiments or examples. In addition, in the case without mutual contradiction, different embodiments or examples described and features of the different embodiments or examples in this description may be combined by those skilled in the art.

Although the embodiments of the present disclosure have been shown and described above, it is to be understood that the above embodiments are illustrative and should not be construed as limitations of the present disclosure, and those skilled in the art can make changes, modifications, substitutions, and variations to the above embodiments within the scope of the present disclosure.

What is claimed is:

1. A monitor system, comprising:
   a controlling module, configured to establish a virtual connection with a processing module via a handshake mechanism, and send human-machine interaction interface information and background picture information of a to-be-displayed output image to the processing module via a same channel, wherein the human-machine interaction interface information and the background picture information of the to-be-displayed output image are pre-stored in a storage region of the controlling module;
   the processing module, configured to receive video image information, perform superimposition processing on the video image information, the human-machine interaction interface information, and the background picture information, and output target image information acquired after the processing to a display; and
   the display, configured to display the target image information;
   wherein the controlling module is further configured to send, upon being powered up, first human-machine interaction interface information to the processing module;
   the processing module is further configured to receive and store the first human-machine interaction interface information, and feed, upon no first human-machine interaction interface information being displayed, first confirmation information back to the controlling module;
   the controlling module is further configured to receive the first confirmation information, and send the background picture information of the to-be-displayed output image to the processing module via the same channel;
   the processing module is further configured to receive and store the background picture information of the to-be-displayed output image, and feed, upon completion of storing the background picture information of the to-be-displayed output image, second confirmation information back to the controlling module;
   the controlling module is further configured to receive the second confirmation information, and send second human-machine interaction interface information to the processing module via the same channel; and
   the processing module is further configured to receive and store the second human-machine interaction interface information.

2. The monitor system according to claim 1, wherein the processing module is particularly configured to:
   acquire a video image analysis result by analyzing the video image information, perform synchronization processing on the video image analysis result, the human-machine interaction interface information, and the background picture information, store a synchronized video image analysis result, synchronized human-machine interaction interface information, and synchronized background picture information which are acquired after the synchronization processing, perform synchronization processing on the video image information, store synchronized video image information acquired after the synchronization processing, perform superimposition processing on the synchronized video image analysis result, the synchronized human-machine interaction interface information, the synchronized background picture information, and the synchronized video image information, and output the target image information acquired after the superimposition processing to the display.

3. The monitor system according to claim 2, wherein the processing module comprises:
a first receiving unit, configured to receive the human-machine interaction interface information and the background picture information;
a first writing controller, configured to write the human-machine interaction interface information into a first memory;
a second writing controller, configured to write the background picture information into the first memory;
a second receiving unit, configured to receive the video image information;
a video image analyzing unit, configured to acquire the video image analysis result by analyzing the video image information;
a third writing controller, configured to write the video image analysis result into the first memory; and
the first memory, configured to perform synchronization processing on the video image analysis result, the human-machine interaction interface information, and the background picture information, and store the synchronized video image analysis result, the synchronized human-machine interaction interface information, and the synchronized background picture information which are acquired after the synchronization processing.

4. The monitor system according to claim 3, wherein the processing module further comprises:
a fourth writing controller, configured to write the video image information into a second memory; and
the second memory, configured to perform synchronization processing on the video image information, and store the synchronized video image information acquired after the synchronization processing.

5. The monitor system according to claim 4, wherein the processing module further comprises:
a first reading controller, configured to read the synchronized human-machine interaction interface information from the first memory;
a second reading controller, configured to read the synchronized background picture information from the first memory;
a third reading controller, configured to read the synchronized video image analysis result from the first memory;
a fourth reading controller, configured to read the synchronized video image information from the second memory;
an image superimposing unit, configured to perform superimposition processing on the read synchronized video image analysis result, synchronized human-machine interaction interface information, synchronized background picture information, and synchronized video image information, and output the target image information acquired after the superimposition processing to a sending unit; and
the sending unit, configured to send the target image information to the display.

6. The monitor system according to claim 3, wherein the controlling module is further configured to:
send a first command to the processing module while sending the human-machine interaction interface information, and send a second command to the processing module while sending the background picture information; and
the processing module further comprises:
a third receiving unit, configured to receive the first command and the second command; and
a command detecting unit, configured to control the first writing controller to start working upon receiving the first command, and control the second writing controller to start working upon receiving the second command.

7. The monitor system according to claim 1, wherein the controlling module is particularly configured to:
send, in a time-sharing mode, the human-machine interaction interface information and the background picture information to the processing module via the same channel.

8. The monitor system according to claim 1, wherein the controlling module is particularly configured to:
upon completion of sending the first human-machine interaction interface information, send the background picture information to the processing module; and
upon completion of sending the background picture information, send corresponding second human-machine interaction interface information according to a received user instruction.

9. The monitor system according to claim 1, wherein a resolution of the video image information is 8 K.

10. A method for controlling displaying of a monitor system, comprising:
establishing, by a controlling module, a virtual connection with a processing module via a handshake mechanism;
sending, by the controlling module, human-machine interaction interface information and background picture information of a to-be-displayed output image to a processing module via a same channel, wherein the human-machine interaction interface information and the background picture information of the to-be-displayed output image are pre-stored in a storage region of the controlling module;
receiving, by the processing module, video image information, performing, by the superimposition processing module, processing on the video image information, the human-machine interaction interface information, and the background picture information, and outputting, by the processing module, target image information acquired after the processing to a display;
displaying, by the display, the target image information;
sending, by the controlling module, first human-machine interaction interface information to the processing module upon being powering up;
receiving and storing, by the processing module, the first human-machine interaction interface information, and feeding, upon no first human-machine interaction interface information being displayed, first confirmation information back to the controlling module;
receiving, by the controlling module, the first confirmation information, and sending the background picture information of the to-be-displayed output image to the processing module via the same channel;
receiving and storing, by the processing module, the background picture information of the to-be-displayed output image, and feeding, upon completion of storing the background picture information of the to-be-displayed output image, second confirmation information back to the controlling module;

receiving, by the controlling module, the second confirmation information, and sending second human-machine interaction interface information to the processing module via the same channel; and receiving and storing, by the processing module, the second human-machine interaction interface information.

11. The method according to claim 10, wherein the processing module is particularly configured to:

acquire a video image analysis result by analyzing the video image information, perform synchronization processing on the video image analysis result, the human-machine interaction interface information, and the background picture information, store a synchronized video image analysis result, synchronized human-machine interaction interface information, and synchronized background picture information which are acquired after the synchronization processing, perform synchronization processing on the video image information, store synchronized video image information acquired after the synchronization processing, perform superimposition processing on the synchronized video image analysis result, the synchronized human-machine interaction interface information, the synchronized background picture information, and the synchronized video image information, and output the target image information acquired after the superimposition processing to the display.

12. The method according to claim 11, wherein the processing module comprises:

a first receiving unit, configured to receive the human-machine interaction interface information and the background picture information;

a first writing controller, configured to write the human-machine interaction interface information into a first memory;

a second writing controller, configured to write the background picture information into the first memory;

a second receiving unit, configured to receive the video image information;

a video image analyzing unit, configured to acquire the video image analysis result by analyzing the video image information;

a third writing controller, configured to write the video image analysis result into the first memory; and the first memory, configured to perform synchronization processing on the video image analysis result, the human-machine interaction interface information, and the background picture information, and store the synchronized video image analysis result, the synchronized human-machine interaction interface information, and the synchronized background picture information which are acquired after the synchronization processing.

13. The method according to claim 12, wherein the processing module further comprises:

a fourth writing controller, configured to write the video image information into a second memory; and the second memory, configured to perform synchronization processing on the video image information, and store the synchronized video image information acquired after the synchronization processing.

14. The method according to claim 13, wherein the processing module further comprises:

a first reading controller, configured to read the synchronized human-machine interaction interface information from the first memory;

a second reading controller, configured to read the synchronized background picture information from the first memory;

a third reading controller, configured to read the synchronized video image analysis result from the first memory;

a fourth reading controller, configured to read the synchronized video image information from the second memory;

an image superimposing unit, configured to perform superimposition processing on the read synchronized video image analysis result, synchronized human-machine interaction interface information, synchronized background picture information, and synchronized video image information, and output the target image information acquired after the superimposition processing to a sending unit; and the sending unit, configured to send the target image information to the display.

15. The method according to claim 12, wherein the controlling module is further configured to:

send a first command to the processing module while sending the human-machine interaction interface information, and send a second command to the processing module while sending the background picture information; and the processing module further comprises:

a third receiving unit, configured to receive the first command and the second command; and a command detecting unit, configured to control the first writing controller to start working upon receiving the first command, and control the second writing controller to start working upon receiving the second command.

16. The method according to claim 10, wherein the controlling module is particularly configured to:

send, in a time-sharing mode, the human-machine interaction interface information and the background picture information to the processing module via the same channel.

17. The method according to claim 10, wherein the controlling module is particularly configured to:

upon completion of sending the first human-machine interaction interface information, send the background picture information to the processing module; and upon completion of sending the background picture information, send corresponding second human-machine interaction interface information according to a received user instruction.

18. The method according to claim 10, wherein a resolution of the video image information is 8 K.

* * * * *